United States Patent
Ito et al.

(10) Patent No.: US 8,016,397 B2
(45) Date of Patent: Sep. 13, 2011

(54) LIQUID SUPPLY DEVICE AND LIQUID EJECTING APPARATUS

(75) Inventors: Hiroyuki Ito, Nagano (JP); Hideya Yokouchi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 452 days.

(21) Appl. No.: 12/339,254

(22) Filed: Dec. 19, 2008

(65) Prior Publication Data

US 2009/0160921 A1 Jun. 25, 2009

(30) Foreign Application Priority Data

Dec. 21, 2007 (JP) ................. 2007-329685
Sep. 1, 2008 (JP) ................. 2008-224154
Nov. 28, 2008 (JP) ................. 2008-305012

(51) Int. Cl.
*B41J 2/175* (2006.01)
*B41J 2/19* (2006.01)

(52) U.S. Cl. .......................................... 347/85; 347/92

(58) Field of Classification Search .................... 347/85, 347/92
See application file for complete search history.

(56) References Cited

U.S. PATENT DOCUMENTS

| 2008/0225090 A1* | 9/2008 | Kobayashi | 347/85 |
| 2009/0058894 A1* | 3/2009 | Nakazawa | 347/7 |
| 2009/0147064 A1* | 6/2009 | Ito et al. | 347/92 |

FOREIGN PATENT DOCUMENTS

| JP | 2005-342960 | 12/2005 |
| JP | 2005-342961 | 12/2005 |
| JP | 2006-095878 | 4/2006 |
| JP | 2007-203523 | 8/2007 |

* cited by examiner

*Primary Examiner* — Huan H Tran
(74) *Attorney, Agent, or Firm* — Workman Nydegger

(57) ABSTRACT

A liquid supply device includes a liquid supply path for supplying liquid from an upstream, liquid supply side toward a downstream side where the liquid is consumed. A defoaming chamber in the middle of the liquid supply path causes bubbles to escape from the liquid. A decompression chamber adjacent to the defoaming chamber has a partition wall interposed therebetween and is decompressed to have lower pressure than the defoaming chamber. The partition wall allows gas to permeate therethrough by decompression of the decompression chamber and regulates permeation of liquid. The partition wall is formed by a separate member from a decompression chamber forming member that forms the decompression chamber. The partition wall forms a part of an inner surface of the liquid supply path, and the liquid supply path passes along the inside of a wall portion of the decompression chamber in the decompression chamber forming member.

6 Claims, 5 Drawing Sheets

LIQUID SUPPLY DEVICE AND LIQUID EJECTING APPARATUS

The entire disclosure of Japanese Patent Application No. 2007-329685, filed Dec. 21, 2007 and Japanese Patent Application No. 2008-224154, filed Sep. 1, 2008 and Japanese Patent Application No. 2008-305012, filed Nov. 28, 2008 are expressly incorporated herein by reference.

BACKGROUND

1. Technical Field

The present invention relates to a liquid ejecting apparatus, such as an ink jet printer, and a liquid supply device provided in the liquid ejecting apparatus.

2. Related Art

In general, an ink jet printer (hereinafter, simply referred to as a 'printer') is widely known as an example of a liquid ejecting apparatus that ejects ink (liquid) from a nozzle of a recording head (liquid ejecting head) onto a target. In such a printer, poor printing, such as dot missing, may be caused when a bubble is generated in the ink ejected from the recording head. For this reason, a printer capable of making gas dissolved in ink escape (removed) from the ink in order to suppress such poor printing has been proposed in the related art (for example, refer to JP-A-2006-95878).

In the printer disclosed in JP-A-2006-95878, a part of a side wall that forms a common liquid chamber (defoaming chamber) of a printing head (liquid supply device) is formed of a gas permeable film (partition wall), and a chamber (decompression chamber) that is decompressed by a pump is provided on an opposite side of the common liquid chamber with the gas permeable film interposed therebetween. In addition, since a pressure difference between the common liquid chamber and the chamber occurs when the chamber is decompressed by the pump, the gas dissolved in ink within the common liquid chamber permeates through the gas permeable film to escape into the chamber due to the pressure difference.

However, in the printer disclosed in JP-A-2006-95878, it is not particularly considered to make the chamber airtight reliably. Accordingly, in the case of stopping a pump after decompressing the chamber with the pump, there was a possibility that the inside of the chamber would not be maintained in a decompressed state.

SUMMARY

An advantage of some aspects of the invention is that it provides a liquid supply device and a liquid ejecting apparatus capable of improving the airtightness in a decompression chamber.

According to an aspect of the invention, a liquid supply device includes: a liquid supply path used to supply liquid from an upstream side, which is a liquid supply source side, toward a downstream side at which the liquid is consumed; a defoaming chamber that is provided in the middle of the liquid supply path and holds a bubble contained in the liquid in order to make the bubble escape from the liquid; and a decompression chamber that is provided at a position adjacent to the defoaming chamber with a partition wall interposed therebetween and is decompressed to have lower pressure than the defoaming chamber. The partition wall is configured to allow gas to permeate therethrough by decompression of the decompression chamber and to regulate permeation of liquid and is formed by a separate member from a decompression chamber forming member that forms the decompression chamber. A part of an inner surface of the liquid supply path is formed by the partition wall, and the liquid supply path passes along the inside of a wall portion of the decompression chamber in the decompression chamber forming member.

According to such a configuration, since a part of the inner surface of the liquid supply path is formed by the partition wall and the liquid supply path passes along the inside of the wall portion of the decompression chamber in the decompression chamber forming member, a part of liquid flowing through the liquid supply path enters between the partition wall and the decompression chamber forming member. Accordingly, the efficiency of sealing between the partition wall and the decompression chamber forming member can be improved due to the ink entering between the partition wall and the decompression chamber forming member. As a result, the airtightness in the decompression chamber can be improved.

According to another aspect of the invention, a liquid supply device includes: a liquid supply path used to supply liquid from an upstream side, which is a liquid supply source side, toward a downstream side at which the liquid is consumed; a defoaming chamber that is provided in the middle of the liquid supply path and is able to make a bubble contained in the liquid escape from the liquid; and a decompression chamber that is provided at a position adjacent to the defoaming chamber with a partition wall interposed therebetween and is decompressed to have lower pressure than the defoaming chamber. The partition wall is configured to allow gas to permeate therethrough by decompression of the decompression chamber and to regulate permeation of liquid and is formed by a separate member from a decompression chamber forming member that forms the decompression chamber. The decompression chamber is formed by blocking an opening of a recess, which is formed in the decompression chamber forming member, with the partition wall, and the liquid supply path is formed to face a contact surface between an opening-end-side contact surface of the recess in the decompression chamber forming member and the partition wall.

According to such a configuration, since the liquid supply path is formed to face the contact surface between the opening-end-side contact surface of the recess and the partition wall, a part of liquid flowing through the liquid supply path enters between the partition wall and the decompression chamber forming member that forms the decompression chamber. Accordingly, the efficiency of sealing between the partition wall and the decompression chamber forming member can be improved due to the ink entering between the partition wall and the decompression chamber forming member. As a result, the airtightness in the decompression chamber can be improved.

In the liquid supply device according to the aspect of the invention, it is preferable that the liquid supply path pass along the inside of the wall portion of the decompression chamber such that the decompression chamber is surrounded.

According to such a configuration, since the liquid supply path passing along the inside of the wall portion of the decompression chamber in the decompression chamber forming member is sucked toward the decompression chamber side over the wall portion by decompressing the decompression chamber, it becomes possible to suppress the growth of bubbles floating in the liquid flowing through the liquid supply path. In addition, the liquid flowing through the liquid supply path that passes along the inside of the wall portion of the decompression chamber in the decompression chamber forming member may prevent the air from permeating through the wall portion of the decompression chamber in the decompression chamber forming member to enter into the decompression chamber. That is, the liquid flowing through the liquid supply path that passes along the inside of the wall portion of the decompression chamber in the decompression chamber forming member may be made to function as a wall for blocking the air that permeates through the wall portion of the decompression chamber to enter into the decompression chamber.

It is preferable that the liquid supply device according to the aspect of the invention further include sealing rubber that is provided between the decompression chamber forming member and the partition wall in order to improve airtightness of the decompression chamber and a part of the inner surface of the liquid supply path be formed by the sealing rubber.

According to such a configuration, a part of liquid flowing through the liquid supply path enters between the sealing rubber and the partition wall by disposing the sealing rubber such that the sealing rubber surrounds the decompression chamber in the up and down direction and the liquid supply path passes along the outer side of the sealing rubber. Accordingly, the efficiency of sealing between the partition wall and the sealing rubber can be further improved by synergistic interaction between the sealing rubber and the ink entering between the partition wall and the sealing rubber. As a result, the airtightness in the decompression chamber can be further improved.

In the liquid supply device according to the aspect of the invention, it is preferable that the liquid supply path be formed by blocking another recess formed on a surface, on which a recess that forms the decompression chamber in the decompression chamber forming member, with the partition wall. In the decompression chamber forming member, it is preferable that an outer wall portion opposite an inner wall portion provided between the decompression chamber and the liquid supply path with the liquid supply path interposed therebetween be bonded to the partition wall by an adhesive.

According to such a configuration, since the outer wall portion of the decompression chamber forming member and the partition wall are bonded to each other by the adhesive, the bonding area where the decompression chamber forming member and the partition wall are bonded by the adhesive is smaller than that in a case in which the entire surfaces of the decompression chamber forming member and the partition wall being in contact with each other are bonded. As a result, it is possible to improve the assembly efficiency of the device.

According to still another aspect of the invention, a liquid ejecting apparatus includes: a liquid ejecting head that ejects liquid; and the liquid supply device that supplies the liquid to the liquid ejecting head and has the configuration described above.

According to such a configuration, the same operations and effects as described above can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an ink jet printer which is an example of a liquid ejecting apparatus according to an embodiment of the invention will be described with reference to the accompanying drawings. Moreover, in the following description, 'back and forth direction', 'left and right direction', and 'up and down direction' refer to back and forth direction, left and right direction, and up and down direction indicated by arrows shown in FIG. 1.

Figure 1:
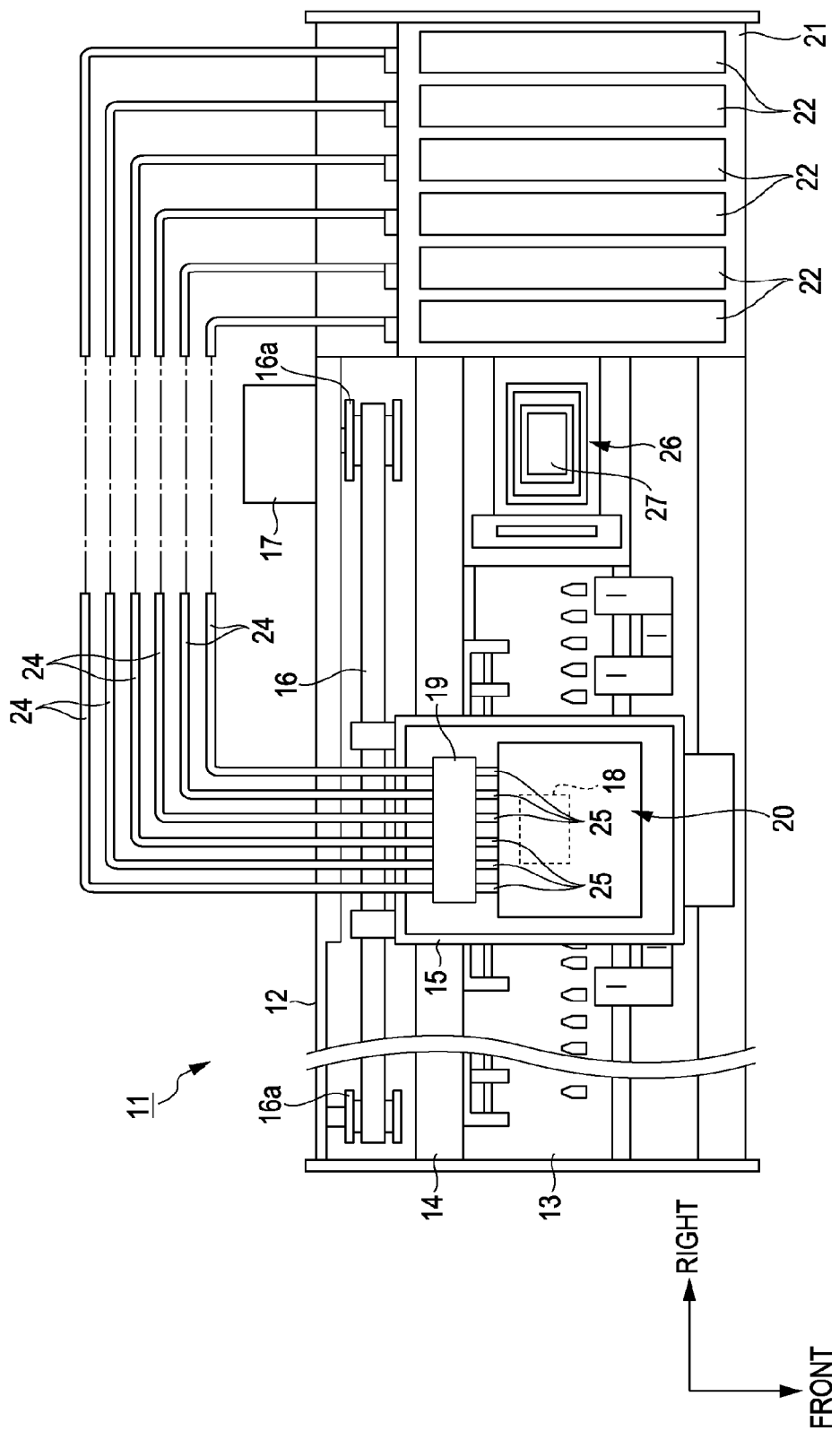
FIG. 1 is a plan view schematically illustrating a printer according to an embodiment.

As shown in FIG. 1, an ink jet printer 11 as a liquid ejecting apparatus includes a body flame 12 having a rectangular shape in plan view. In the body flame 12, a platen 13 is provided to extend in the left and right direction which is a main scanning direction. On the platen 13, recording paper (not shown) is fed along the back and forth direction, which is a sub-scanning direction, by a paper feed mechanism (not shown). In addition, a rod-like guide shaft 14 extending in parallel in the longitudinal direction (left and right direction) of the platen 13 is provided above the platen 13 in the body flame 12.

A carriage 15 is supported on the guide shaft 14 such that the carriage 15 can reciprocate along the guide shaft 14. The carriage 15 is connected with a carriage motor 17, which is provided on a back surface of the body flame 12, through an endless timing belt 16 stretched between a pair of pulleys 16a provided on an inner surface of a rear wall of the body flame 12. Accordingly, the carriage 15 reciprocates along the guide shaft 14 by driving of the carriage motor 17.

As shown in FIG. 1, a recording head 18 as a liquid ejecting head is supported on a lower end side of the carriage 15 facing the platen 13. Furthermore, a valve unit 19 that supplies ink as liquid, which is temporarily stored, to a downstream side (side of the recording head 18) and a defoaming unit 20, which has a rectangular shape in plan view and serves to make a bubble contained (floating) in the ink supplied from the valve unit 19 escape from the ink and to supply to the recording head 18 the ink from which the bubble has escaped, are mounted on the carriage 15.

A plurality of nozzles (not shown) is opened in a bottom surface of the recording head 18. Printing is performed by ejecting an ink droplet from an opening of each nozzle onto recording paper (not shown) fed on the platen 13 by driving a piezoelectric element (not shown) provided in the recording head 18.

A cartridge holder 21 is provided in a right end portion of the body flame 12. In the cartridge holder 21, a plurality of ink cartridges 22 (six ink cartridges 22 in the present embodiment) that contain different kinds (colors) of ink therein are detachably mounted. In addition, the ink cartridges 22 are located at the upstream side as liquid supply sources. The cartridge holder 21 is connected with the valve unit 19, which is mounted on the carriage 15, through a plurality of ink supply tubes 24 (six ink supply tubes 24 in the present embodiment).

Moreover, in a state where each ink cartridge 22 is mounted in the cartridge holder 21, each ink cartridge 22 communicates with the valve unit 19 through each ink supply tube 24. In addition, the valve unit 19 stores ink, which is supplied from each ink cartridge 22 through each ink supply tube 24, temporarily and separately. The ink that is stored temporarily and separately is supplied to a defoaming unit 20 through a corresponding flow channel 25.

Furthermore, as shown in FIG. 1, a maintenance unit 26 for performing the maintenance, such as cleaning, of the recording head 18 is provided in a home position region of the carriage 15 positioned near the right end portion in the body flame 12. The maintenance unit 26 includes: a cap 27 that comes in contact with the recording head 18 to surround each nozzle (not shown) of the recording head 18 or receives ink discharged from the opening of each nozzle by flushing; and a suction pump (not shown) that can performs suction in the cap 27.

In addition, by performing suction in the cap 27 with a suction pump (not shown) in a state where the cap 27 is made to come in contact with the recording head 18 to surround the opening of each nozzle (not shown) of the recording head 18, a bubble or ink whose viscosity has increased is forcibly discharged from each nozzle (not shown) into the cap 27, so-called cleaning is performed.

Next, the configuration of the defoaming unit 20 will be described in detail.

Figure 2:
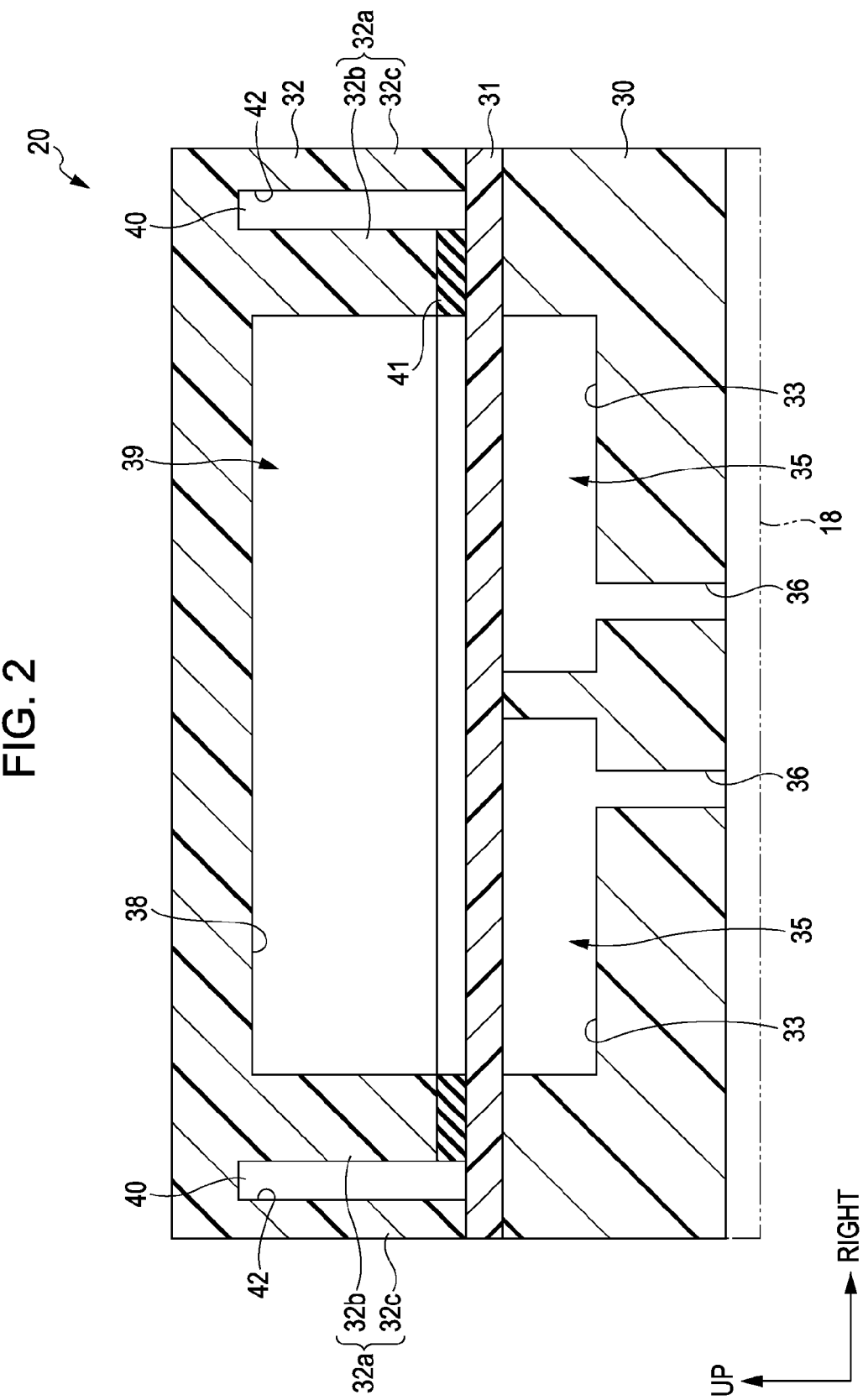
FIG. 2 is a cross-sectional view illustrating a defoaming unit of the printer.

As shown in FIG. 2, the defoaming unit 20 includes a plate-shaped defoaming chamber forming member 30, a plate-shaped partition wall 31 provided on an upper surface of the defoaming chamber forming member 30, and a plate-shaped decompression chamber forming member 32 provided on an upper surface of the partition wall 31. Each of the defoaming chamber forming member 30, the partition wall 31, and the decompression chamber forming member 32 is formed of a plate made of a rigid synthetic resin. That is, the defoaming chamber forming member 30, the partition wall 31, and the decompression chamber forming member 32 are formed of separate members.

The partition wall 31 is molded by using a material allowing gas to permeate therethrough when the decompression chamber 39 is decompressed, for example, POM (polyacetal) PP (polypropylene), or PPE (polyphenylene ether).

A material of the defoaming chamber forming member 30 and the decompression chamber forming member 32 is different from the material of the partition wall 31. In addition, the gas permeability of a synthetic resin used to form the defoaming chamber forming member 30 and the decompression chamber forming member 32 is lower than that of a synthetic resin used to form the partition wall 31 such that external gas (air) does not permeate through the synthetic resin to form a bubble in the internal ink.

A plurality of defoaming recesses 33 (six defoaming recesses 33 in the present embodiment) having rectangular shapes in plan view extending in the horizontal direction are provided in parallel on the upper surface of the defoaming chamber forming member 30. The defoaming recesses 33 are disposed at equal distances in the back and forth direction and left and right direction to form three columns in the back and forth direction and two columns in the back and forth direction. That is, the six defoaming recesses 33 are disposed such that the left three defoaming recesses 33 and the right three defoaming recesses 33 are symmetrical with respect to the middle of the defoaming chamber forming member 30 in the left and right direction. In addition, six spaces formed to be surrounded by the defoaming recesses 33 and the partition wall 31 serve as defoaming chambers 35 for making a bubble contained in ink escape from the ink.

As shown in FIG. 2, an outlet 36 for making the ink within the defoaming chamber 35 flow to the side of the recording head 18 positioned at the downstream side, in which the ink is consumed, is opened in a portion, which is an end portion on a middle portion side in the left and right direction of the defoaming chamber forming member 30 and is a middle portion in the back and forth direction, on a bottom surface of each defoaming recess 33. In addition, a decompression recess 38 serving as a recess having a rectangular shape in plan view, which is long in the back and forth direction, is formed in a middle portion on a bottom surface of the decompression chamber forming member 32. In addition, a space formed to be surrounded by the decompression recess 38 and the partition wall 31 by blocking an opening of the decompression recess 38 with the partition wall 31 serves as the decompression chamber 39.

The decompression chamber 39 is decompressed such that the internal pressure is lower than the pressure of each defoaming chamber 35 by a decompression pump (not shown) and overlaps the entire part of each defoaming chamber 35 in plan view. Accordingly, the decompression chamber 39 is disposed above each defoaming chamber 35 so as to be adjacent to the defoaming chamber 35 with the partition wall 31 interposed therebetween.

In addition, the thickness of the partition wall 31 is set to a thickness that allows a bubble floating in the ink within each defoaming chamber 35 to permeate through the partition wall 31 to escape toward the decompression chamber 39 by decompression of the decompression chamber 39.

Moreover, in the present embodiment, it could be seen from the experimental result that the appropriate permeation efficiency was obtained when the area and thickness of a portion of the partition wall 31 interposed between the decompression chamber 39 and each defoaming chamber 35 were set to about 1 cm$^2$ and 1 mm, respectively. In addition, it is also preferable to use a material having an air permeation coefficient of 5 cc·mm/m$^2$·day·atm or more and a moisture permeation coefficient of 30 g·mm/m$^2$·day·atm or less. A material, which satisfies this condition, other than the materials described above, may also be used to form the partition wall 31.

Ink flow channels (not shown) for connecting the flow channel 25 (refer to FIG. 1) extending from the valve unit 19 (refer to FIG. 1) with each defoaming chamber 35 such that the flow channel 25 and each defoaming chamber 35 communicate with each other are formed in the partition wall 31, the decompression chamber forming member 32, and the defoaming chamber forming member 30. An ink flow channel, in which ink flowing therethrough foams most easily, among the ink flow channels serves as a specific ink flow channel 40, as shown in FIG. 2.

The specific ink flow channel 40 extends to surround the decompression chamber 39 within a peripheral wall 32a as a wall portion of the decompression chamber 39 in the decompression chamber forming member 32 and has a rectangular shape which is vertically long in plan view. A bottom surface of the peripheral wall 32a, which is a part of an inner surface of the specific ink flow channel 40, is formed by a part of an upper surface of the partition wall 31. In addition, an upper end of the specific ink flow channel 40 within the peripheral wall 32a is slightly higher than an upper end of the decompression chamber 39.

That is, a flow channel recess 42 as a recess is formed on a bottom surface of the decompression chamber forming member 32, on which the decompression recess 38 is formed to be opened, such that the opening of the decompression recess 38 is surrounded, and the specific ink flow channel 40 is formed by blocking the opening of the flow channel recess 42 with the partition wall 31. Accordingly, the specific ink flow channel 40 is formed to face a contact surface between an opening-end-side contact surface of the decompression recess 38, which forms the decompression chamber 39, and the partition wall 31. In addition, a portion of the peripheral wall 32a of the decompression chamber forming member 32 interposed between the decompression chamber 39 and the specific ink flow channel 40 serves as an inner wall portion 32b, and a portion of the peripheral wall 32a positioned opposite the inner wall portion with the specific ink flow channel 40 interposed therebetween serves as an outer wall portion 32c.

Between the upper surface of the partition wall 31 and a bottom surface of the decompression chamber forming member 32 (inner wall portion 32b) on the inner side of the specific ink flow channel 40, an annular sealing rubber 41 is provided to surround the decompression chamber 39 in plan view. The sealing rubber 41 improves the efficiency of sealing between the decompression chamber forming member 32 and the partition wall 31, which improves the airtightness of the decompression chamber 39. In addition, an inner peripheral surface of the sealing rubber 41 forms a part of a wall surface of the decompression chamber 39, and an outer peripheral surface of the sealing rubber 41 forms a part of an inner surface of the specific ink flow channel 40. In addition, the upper surface of the partition wall 31 and a bottom surface of the decompression chamber forming member 32 (outer wall portion 32c) on the outer side of the specific ink flow channel 40 are bonded to each other by adhesive.

Furthermore, in the present embodiment, a liquid supply path is formed by each ink supply tube 24, the valve unit 19, each flow channel 25, each ink flow channel including the specific ink flow channel 40, the defoaming chamber 35, and each outlet 36, and a liquid supply device is formed by each ink supply tube 24, the valve unit 19, each flow channel 25, and the defoaming unit 20.

Next, an operation of the defoaming unit 20 will be described.

When ink is supplied to the defoaming unit 20 through each flow channel 25, the ink flows through each ink flow channel including the specific ink flow channel 40 to be supplied to each defoaming chamber 35. Then, the ink supplied to each defoaming chamber 35 is supplied to the recording head 18 through each outlet 36.

In this case, a bubble may be contained in the ink supplied to each defoaming chamber 35. However, when the decompression chamber 39 is made to be decompressed (in the present embodiment, the pressure of the decompression chamber 39 is lowered up to about −30 kPa) with a decompression pump (not shown) such that the pressure of the decompression chamber 39 becomes lower than the pressure of each defoaming chamber 35, a bubble floating in the ink within each defoaming chamber 35 permeates through the partition wall 31 to escape toward the decompression chamber 39 due to the pressure difference between the decompression chamber 39 and each defoaming chamber 35.

Furthermore, in this case, since the ink flowing through the specific ink flow channel 40 is in contact with the upper surface of the partition wall 31 and a part of the ink flows between the bottom surface of the sealing rubber 41 and the upper surface of the partition wall 31 (flows to a portion that the specific ink flow channel 40 faces), the efficiency of sealing between the peripheral wall 32a of the decompression chamber 39 and the upper surface of the partition wall 31 is improved. In addition, since the specific ink flow channel 40 passes along the inside of the peripheral wall 32a of the decompression chamber 39 such that the decompression chamber 39 is surrounded, the air that permeates through the peripheral wall 32a to enter into the decompression chamber 39 is blocked by the ink flowing through the specific ink flow channel 40. That is, the ink flowing through the specific ink flow channel 40 functions as a wall for blocking the air that permeates through the peripheral wall 32a to enter into the decompression chamber 39. As a result, the airtightness of the decompression chamber 39 is improved.

Accordingly, for example, even if a valve (not shown) is disposed between the decompression chamber 39 and a decompression pump (not shown) for decompressing the decompression chamber 39 and driving of the decompression pump is stopped after decompressing the decompression chamber 39 and closing the valve, the decompressed state of the decompression chamber 39 is maintained for a long time. Therefore, the decompression pump (not shown) for decompressing the decompression chamber 39 does not need to be driven all the time.

In addition, since the specific ink flow channel 40 passes along the inside of the peripheral wall 32a of the decompression chamber 39 such that the decompression chamber 39 is surrounded, the specific ink flow channel 40 is sucked toward the decompression chamber 39 over the peripheral wall 32a. As a result, the growth of bubbles in the ink flowing through the specific ink flow channel 40 is suppressed.

According to the present embodiment described above, the following effects can be obtained.

(1) The specific ink flow channel 40 has a bottom surface formed by a part of the upper surface of the partition wall 31 and passes along the inside of the peripheral wall 32a of the decompression chamber 39 in the decompression chamber forming member 32. For this reason, a part of ink flowing through the specific ink flow channel 40 enters between the upper surface of the partition wall 31 and the bottom surface of the peripheral wall 32a. Accordingly, the efficiency of sealing between the upper surface of the partition wall 31 and the bottom surface of the peripheral wall 32a can be improved due to the ink entering between the bottom surface of the partition wall 31 and the bottom surface of the peripheral wall 32a. As a result, the airtightness in the decompression chamber 39 can be improved.

(2) The specific ink flow channel 40 is formed to face a contact surface between an opening-end-side contact surface of the decompression recess 38 and the partition wall 31. For this reason, a part of ink flowing through the specific ink flow channel 40 enters between the partition wall 31 and the decompression chamber forming member 32 that forms the decompression chamber 39. Accordingly, the efficiency of sealing between the partition wall 31 and the decompression chamber forming member 32 can be improved due to the ink entering between the partition wall 31 and the decompression chamber forming member 32. As a result, the airtightness in the decompression chamber 39 can be improved.

(3) Since the specific ink flow channel 40 passes along the inside of the peripheral wall 32a of the decompression chamber 39 such that the decompression chamber 39 is surrounded, the specific ink flow channel 40 passing along the inside of the peripheral wall 32a can be sucked toward the decompression chamber 39 over the peripheral wall 32a by decompressing the decompression chamber 39. Accordingly, the growth of bubbles floating in the ink flowing through the specific ink flow channel 40 can be suppressed.

(4) Furthermore, since the specific ink flow channel 40 passes along the inside of the peripheral wall 32a of the decompression chamber 39 such that the decompression chamber 39 is surrounded, the ink flowing through the specific ink flow channel 40 may prevent the air from permeating through the peripheral wall 32a to enter into the decompression chamber 39. That is, the ink flowing through the specific ink flow channel 40 may be made to function as a wall for blocking the air that permeates through the peripheral wall 32a of the decompression chamber 39 to enter into the decompression chamber 39.

(5) Since the annular sealing rubber 41 for improving the airtightness of the decompression chamber 39 is interposed between the bottom surface of the peripheral wall 32a of the decompression chamber 39 and the upper surface of the partition wall 31 such that the decompression chamber 39 is surrounded in the up and down direction, a part of the inner surface of the specific ink flow channel 40 is formed by the outer peripheral surface of the sealing rubber 41. For this reason, a part of ink flowing through the specific ink flow channel 40 passing through the outer side of the sealing rubber 41 enters between the bottom surface of the sealing rubber 41 and the upper surface of the partition wall 31. Accordingly, the efficiency of sealing between the upper surface of the partition wall 31 and the bottom surface of the sealing rubber 41 can be improved by synergistic interaction between the sealing rubber 41 and the ink entering between the upper surface of the partition wall 31 and the bottom surface of the sealing rubber 41. As a result, the airtightness in the decompression chamber 39 can be further improved.

(6) The bottom surface of the decompression chamber forming member 32 and the upper surface of the partition wall 31 are bonded to each other by adhesive on the outer side (outer wall portion 32c) of the specific ink flow channel 40. For this reason, the bonding area using the adhesive becomes smaller than that in a case in which the bottom surface of the decompression chamber forming member 32 and the upper surface of the partition wall 31 are bonded to each other on both the inner and outer sides of the specific ink flow channel 40. As a result, it is possible to reduce the amount of moisture evaporation of ink to the outside through the adhesive and to improve the assembly efficiency of the defoaming unit 20 and the assembly efficiency of the liquid supply device.

Modifications

In addition, the above-described embodiment may also be modified as follows.

In first to third modifications, the configurations of the specific ink flow channels 40A, 40B, and 40C are different and the other configurations are equal. Accordingly, the same reference numerals are given, and a detailed repeated description thereof will be omitted.

First Modification

Figure 3:
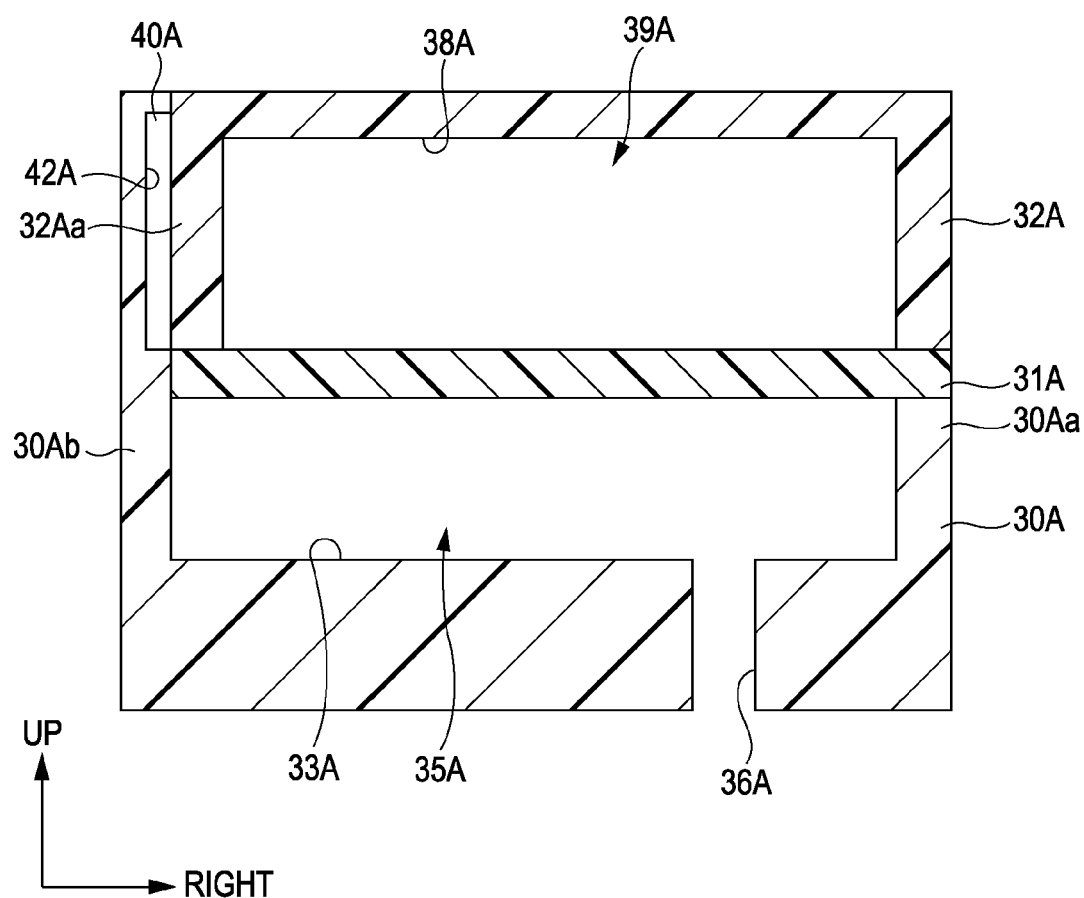
FIG. 3 is a cross-sectional view illustrating a defoaming unit in a modification.

As shown in FIG. 3, a specific ink flow channel 40A may be formed to be surrounded by a decompression chamber forming member 32A and a defoaming chamber forming member 30A.

A decompression chamber 39A is formed to be sealed by blocking an opening of a decompression recess 38A, which is formed to be opened on a bottom surface of the decompression chamber forming member 32A, with a partition wall 31A, which has the same size as the decompression chamber forming member 32A in plan view, and is formed to be blocked with sealing rubber (not shown). Furthermore, at a position adjacent to the decompression chamber 39A with the partition wall 31A interposed therebetween, a defoaming chamber 35A in which a defoaming recess 33A is formed to be opened on an upper surface of the defoaming chamber forming member 30A and which is blocked by the partition wall 31A is provided. Furthermore, an outlet 36A for making the ink in the defoaming chamber 35A flow toward the recording head 18 is opened on a bottom surface of the defoaming recess 33A.

Furthermore, in the defoaming chamber forming member 30A that forms the defoaming chamber 35A, an upper end surface of a right wall 30Aa shown in FIG. 3 is bonded to a bottom surface of the partition wall 31A. On the other hand, an upper end surface of a left wall 30Ab of the defoaming chamber forming member 30A is on the same plane as the upper surface of the decompression chamber forming member 32A, such that a right side surface of the left wall 30Ab and a left side surface of the partition wall 31A are bonded to each other. In addition, a flow channel recess 42A is formed to be opened on the right side surface of the left wall 30Ab along a peripheral wall 32Aa of the decompression chamber forming member 32A, and a space formed to be surrounded by the peripheral wall 32Aa and the flow channel recess 42A serves as a specific ink flow channel 40A.

An upper end of the specific ink flow channel 40A is slightly higher than an upper end of the decompression chamber 39A, while a lower end of the specific ink flow channel 40A is formed to be positioned on the same plane as the upper surface of the partition wall 31. Accordingly, ink from the specific ink flow channel 40A permeates between the upper surface of the partition wall 31A and sealing rubber (not shown) (permeates into a portion that the specific ink flow channel 40A faces). As a result, the efficiency of sealing between the upper surface of the partition wall 31A and the bottom surface of the sealing rubber can be improved.

Second Modification

Figure 4:
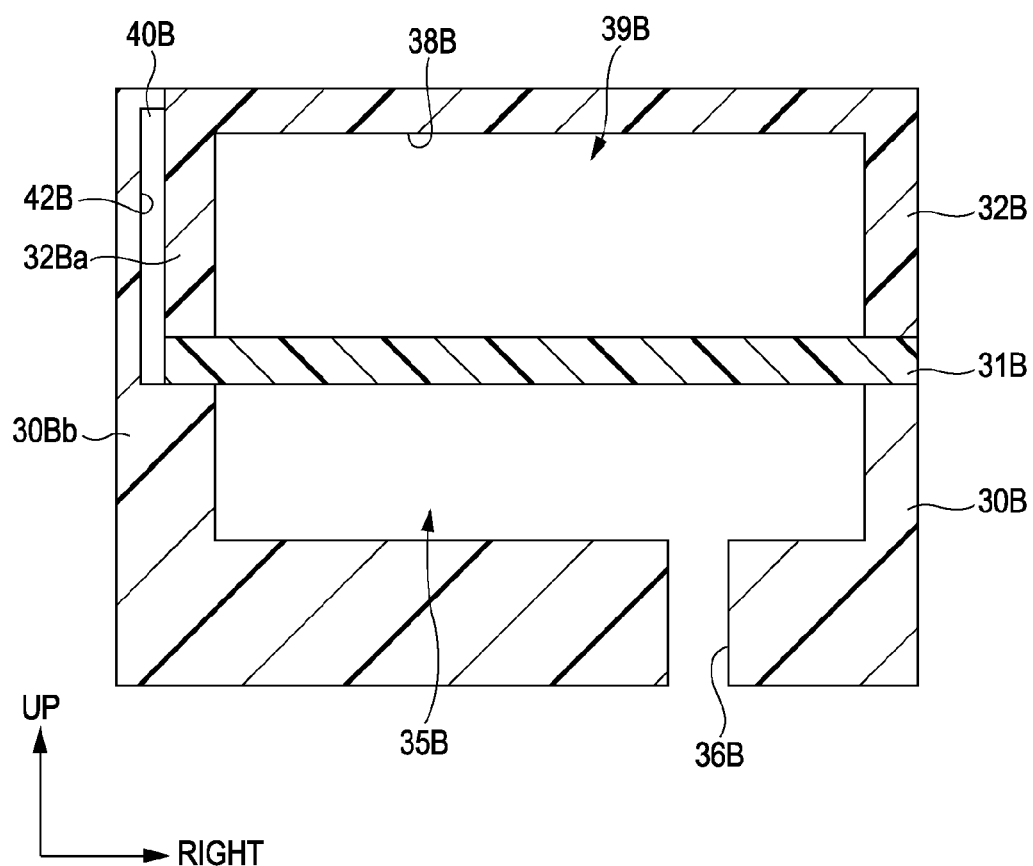
FIG. 4 is a cross-sectional view illustrating a defoaming unit in a modification.

As shown in FIG. 4, a specific ink flow channel 40B may be formed to be surrounded by a decompression chamber forming member 32B, a partition wall 31B, and a defoaming chamber forming member 30B.

A part of a lower end of a flow channel recess 42B formed in a left wall 30Bb of the defoaming chamber forming member 30B is bonded to a bottom surface of the partition wall 31B. In addition, the specific ink flow channel 40B is formed by blocking the flow channel recess 42B with the defoaming chamber forming member 30B and the partition wall 31B.

Also in this configuration, ink from the specific ink flow channel 40B permeates between an upper surface of the partition wall 31B and sealing rubber (not shown) (permeates into a portion that the specific ink flow channel 40B faces). As a result, the efficiency of sealing between the upper surface of the partition wall 31B and the bottom surface of the sealing rubber can be improved.

Third Modification

Figure 5:
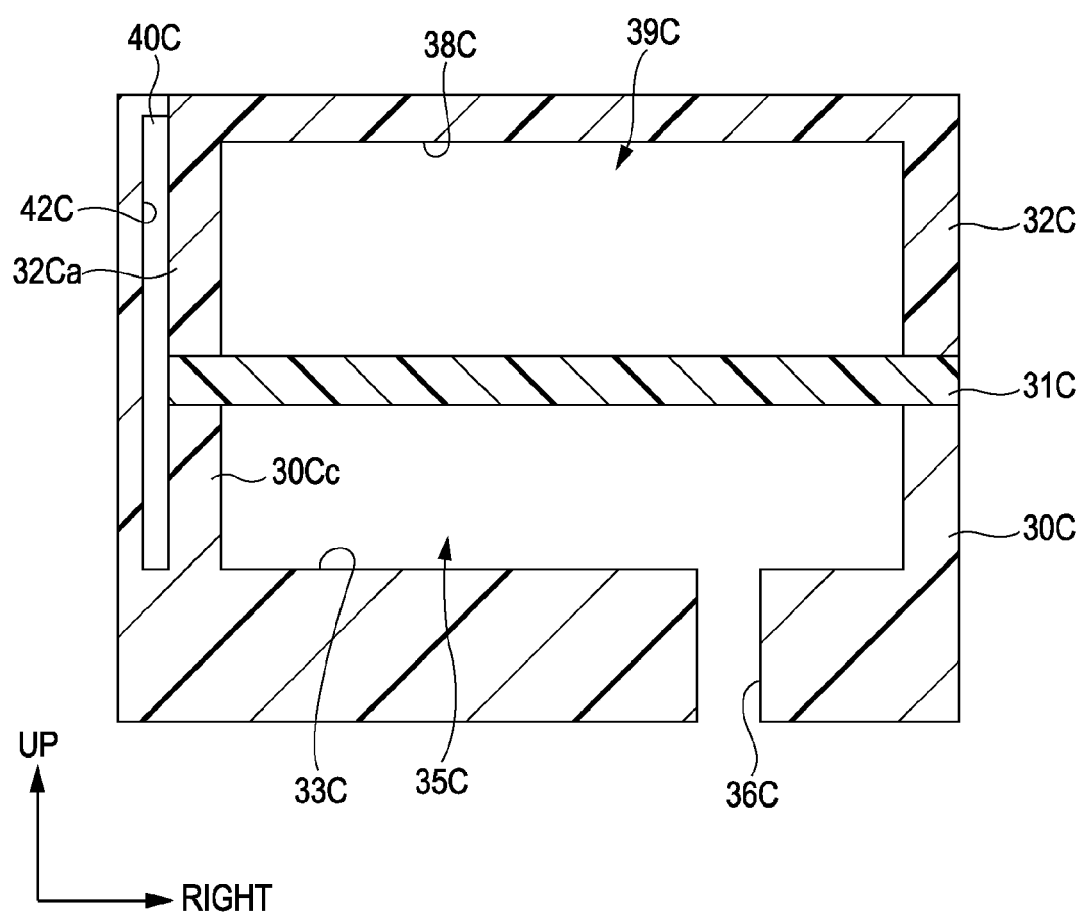
FIG. 5 is a cross-sectional view illustrating a defoaming unit in a modification.

As shown in FIG. 5, a lower end of a specific ink flow channel 40C is formed up to the height of a bottom surface of a defoaming recess 33C, and the specific ink flow channel 40C and a defoaming chamber 35C are adjacent to each other with an inner wall portion 30Cc of a defoaming chamber forming member 30C interposed therebetween. In addition, an upper end surface of the inner wall portion 30Cc is bonded to a bottom surface of a partition wall 31C.

In addition, the inner wall portion 30Cc of the defoaming chamber to which the specific ink flow channel 40C is connected and through which ink flows may not be provided.

Also in this configuration, ink from the specific ink flow channel 40C permeates between an upper surface of the partition wall 31C and sealing rubber (not shown) (permeates into a portion that the specific ink flow channel 40C faces). As a result, the efficiency of sealing between the upper surface of the partition wall 31C and the bottom surface of the sealing rubber can be improved.

Instead of the sealing rubber 41, an adhesive layer using an adhesive may also be provided.

The specific ink flow channel 40 does not necessarily need to surround the decompression chamber 39 as long as the specific ink flow channel 40 passes along the inside of the peripheral wall 32a of the decompression chamber 39.

Two or more of ink flow channels including the specific ink flow channel 40 passing through the inside of the peripheral wall 32a of the decompression chamber 39 may be configured to surround the decompression chamber 39.

Each ink flow channel including the specific ink flow channel 40 passing through the inside of the peripheral wall 32a of the decompression chamber 39 may have a circular or elliptical shape or a polygonal shape, such as a triangle or a pentagon, other than a rectangular shape.

The defoaming chamber 35 does not need to be provided below the decompression chamber 39 in the vertical direction. For example, the defoaming chamber 35 may be disposed above the decompression chamber 39 so as to be adjacent to the decompression chamber 39 with the partition wall 31 interposed therebetween. Alternatively, the defoaming chamber 35 may also be disposed laterally with the decompression chamber 39 with the partition wall 31 interposed therebetween. Also in this case, since the negative pressure within the decompression chamber 39 acts on the defoaming chamber 35 through the partition wall 31, the growth of bubbles in the defoaming chamber 35 can be suppressed.

Although the depressurizing pump for depressurizing the inside of the depressurization chamber 39 had been described in this embodiment, the invention is not limited to it. For example, the inside of the defoaming chamber may be pressurized by a pressurizing pump for pressurizing the inside of the depressurization chamber is lower than that of the defoaming chamber. Another example configuration is as follows: the inside of the depressurization chamber 39 may be depressurized by the depressurizing means(the depressurization pump), and at the same time, the inside of the defoaming chamber may be pressurized so that pressure of the inside of the depressurization chamber is lower than that of defoaming chamber. Like these examples, any configuration can be possible if blockage of the downstream channel of the defoaming chamber pressurizes the ink in the upstream channel of the defoaming chamber.

Even though the liquid ejecting apparatus is embodied as the ink jet printer 11 in the above-described embodiment, the liquid ejecting apparatus may also be embodied as a liquid ejecting apparatus that ejects liquid (including a liquid-like body in which particles of a functional material are dispersed or mixed and a fluid-like body, such as gel) other than ink. In addition, in this specification, examples of the 'liquid' include a liquid-like body and a fluid-like body as well as an inorganic solvent, an organic solvent, a solution, a liquid-like resin, and a liquid-like metal (liquid in which metal is melted).

Even though the liquid ejecting apparatus is embodied as the ink jet printer 11 in the above-described embodiment, a liquid ejecting apparatus that ejects or discharges liquid other than ink may also be adopted. For example, various liquid ejecting apparatuses each having a liquid ejecting head that discharges a small amount of liquid droplets may also be used. In addition, the liquid droplets refer to a state of liquid discharged from the liquid ejecting apparatus and include ones tailing in the shape of particle, tear, or thread. Moreover, the liquid referred herein may be a material that can be ejected by the liquid ejecting apparatus. For example, a material that is in a liquid-phase state may be used. That is, a liquid-like body, sol, or gel water having high or low viscosity and a fluid-like material, such as an inorganic solvent, an organic solvent, a solution, a liquid-like resin, and a liquid-like metal (liquid in which metal is melted) may be used. In addition, not only liquid as one state of a material but also a material in which particles of a functional material formed of solids, such as pigment or metallic particles are dissolved, dispersed, or mixed may also be used. Moreover, representative examples of liquid may include the ink described in the above embodiment and liquid crystal. Here, examples of the ink may include not only typical aqueous ink and oily ink but also various liquid compositions, such as gel ink and hot melt ink. Specific examples of the liquid ejecting apparatus may include a liquid ejecting apparatus that ejects liquid containing a material used for manufacturing a liquid crystal display device, an EL (electroluminescent) display device, and a surface-emitting display device, such as an electrode material or a color material, in the form of dispersion or solution, a liquid ejecting apparatus that ejects a bioorganic material used for manufacturing a biochip, a liquid ejecting apparatus that ejects liquid as a sample used as a precision pipet, a textile printing apparatus, and a microdispenser. In addition, a liquid ejecting apparatus that ejects lubricating oil to precision instruments, such as a watch and a camera, by pinpoint, a liquid ejecting apparatus that ejects transparent resin liquid, such as ultraviolet curing resin, onto a substrate in order to form a fine hemispherical lens (optical lens) used in an optical communication device or the like, or a liquid ejecting apparatus that ejects acid etching liquid or alkali etching liquid in order to etch a substrate or the like, may also be adopted. In addition, the invention may be applied to any one of the light ejecting apparatuses described above.

What is claimed is:

1. A liquid supply device comprising:
   a liquid supply path used to supply liquid from an upstream side, which is a liquid supply source side, toward a downstream side at which the liquid is consumed;
   a defoaming chamber that is provided in the middle of the liquid supply path and holds a bubble contained in the liquid in order to make the bubble escape from the liquid; and
   a decompression chamber that is provided at a position adjacent to the defoaming chamber with a partition wall interposed therebetween and has a lower pressure than the defoaming chamber,
   wherein the partition wall is configured to allow gas to permeate therethrough and to regulate permeation of liquid and is formed by a separate member from a decompression chamber forming member that forms the decompression chamber, and
   a part of an inner surface of the liquid supply path is formed by the partition wall, and the liquid supply path passes along the inside of a wall portion of the decompression chamber in the decompression chamber forming member.

2. A liquid supply device comprising:
   a liquid supply path used to supply liquid from an upstream side, which is a liquid supply source side, toward a downstream side at which the liquid is consumed;
   a defoaming chamber that is provided in the middle of the liquid supply path and is able to make a bubble contained in the liquid escape from the liquid; and
   a decompression chamber that is provided at a position adjacent to the defoaming chamber with a partition wall interposed therebetween and has a lower pressure than the defoaming chamber,
   wherein the partition wall is configured to allow gas to permeate therethrough and to regulate permeation of liquid and is formed by a separate member from a decompression chamber forming member that forms the decompression chamber, the decompression chamber is formed by blocking an opening of a recess, which is formed in the decompression chamber forming member, with the partition wall, and the liquid supply path is formed to face a contact surface between an opening-end-side contact surface of the recess in the decompression chamber forming member and the partition wall.

3. The liquid supply device according to claim 1,
wherein the liquid supply path passes along the inside of the wall portion of the decompression chamber such that the decompression chamber is surrounded.

4. The liquid supply device according to claim 1, further comprising:

sealing rubber that is provided between the decompression chamber forming member and the partition wall in order to improve airtightness of the decompression chamber, wherein a part of the inner surface of the liquid supply path is formed by the sealing rubber.

5. The liquid supply device according to claim 1,
wherein the liquid supply path is formed by blocking another recess formed on a surface, on which a recess that forms the decompression chamber in the decompression chamber forming member, with the partition wall, and in the decompression chamber forming member, an outer wall portion opposite an inner wall portion provided between the decompression chamber and the liquid supply path with the liquid supply path interposed therebetween is bonded to the partition wall by an adhesive.

6. A liquid ejecting apparatus comprising:
a liquid ejecting head that ejects liquid; and
the liquid supply device according to claim 1 that supplies the liquid to the liquid ejecting head.

* * * * *